(12) United States Patent
Hara

(10) Patent No.: US 6,424,783 B1
(45) Date of Patent: Jul. 23, 2002

(54) OPTICAL FIBER REEL, OPTICAL FIBER STORING CASE AND OPTICAL REPEATER

(75) Inventor: Shoichiro Hara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 29 days.

(21) Appl. No.: 09/666,588

(22) Filed: Sep. 20, 2000

(30) Foreign Application Priority Data

Sep. 30, 1999 (JP) .......................................... 11-278488

(51) Int. Cl.$^7$ ................................................ G02B 6/00

(52) U.S. Cl. ..................................................... 385/135

(58) Field of Search ............................... 385/134, 135, 385/136, 137, 138, 139

(56) References Cited

U.S. PATENT DOCUMENTS

| 4,798,432 A | * | 1/1989 | Becker et al. | 350/96.2 |
| 4,840,449 A | * | 6/1989 | Ghandeharizadeh | 350/96.2 |
| 5,013,121 A | * | 5/1991 | Anton et al. | 350/96.2 |
| 5,142,661 A | * | 8/1992 | Grant et al. | 385/135 |
| 5,457,764 A | * | 10/1995 | Edera | 385/135 |
| 5,515,200 A | * | 5/1996 | Delrosso et al. | 359/341 |
| 5,544,273 A | * | 8/1996 | Harrison | 385/135 |
| 5,647,045 A | * | 7/1997 | Robinson et al. | 385/135 |
| 5,911,027 A | * | 6/1999 | Macken et al. | 385/135 |

FOREIGN PATENT DOCUMENTS

JP           11-174238        7/1999

* cited by examiner

*Primary Examiner*—Brian Sircus
*Assistant Examiner*—Thanh-Tam Le
(74) *Attorney, Agent, or Firm*—Burns, Doane, Swecker & Mathis, LLP

(57) ABSTRACT

An optical fiber reel includes, two optical fiber take-up members taking-up an optical fiber and two flat plate like frame members sandwiching the two optical fiber take-up members between them. The two flat plate like frame members, covering the two optical fiber take-up members, have external circumferential configuration of which diameter is larger than diameter of a circumscribed circle of the two optical take-up members by not less than three times of d of diameter of the optical fiber, and arranged facing each other to make a gap not less than d but less than 2d, each of the two optical fiber take-up members have an external circumferential take-up face and a pair of outer surfaces, and arranged as the pair of outer surfaces being parallel to a flat plate face of the frame members to make a gap of not less than d between each other external circumferential take-up faces of the take-up members. The external circumference of the plane like frame members and external circumferential take-up faces of the optical fiber take-up members have a gap of not less than d between them.

20 Claims, 17 Drawing Sheets

34:CIRCULAR THIN PLATE MEMBER
34a:PROJECTION
34b:RECESSION

1: CASE BODY
2: LID
3: OPTICAL FIBER REEL
4: PILLAR MEMBER
5: BOBBIN
6: OPTICAL FIBER
12: INTRODUCTION OPENING

31:OPTICAL FIBER TAKE-UP MEMBER
32:FRAME MEMBER
33:SPACE

34:CIRCULAR THIN PLATE MEMBER
34a:PROJECTION
34b:RECESSION 61,62,64,65:OPTICAL FIBER
71,72:OPTICAL PART
63:FUSION POINT

35:DISC
36:DISC

5a:BOBBIN
5b:BOBBIN

1a:CASE
1b:CASE
50:GUIDE
51:FUSION POINT FIXING PORTION

OPTICAL FIBER REEL, OPTICAL FIBER STORING CASE AND OPTICAL REPEATER

BACKGROUND OF THE INVENTION

1. Field of the Invention

The present invention relates to an optical fiber reel and an optical fiber storing case for storing an optical fiber used for optical wiring in optical communication equipment such as an optical amplifier. And further, the present invention relates to an optical repeater using the optical fiber reel and the optical fiber storing case.

2. Description of the Related Art

Fusion splicing is generally used to splice optical fibers used for optical wiring in an optical communication equipment. Diameter of an optical fiber is, for example, 125 $\mu$m and diameter of a core in which light propagates is more small of about 10 $\mu$m. It is necessary to set end portions of the optical fibers to be spliced into an fusing apparatus with high accuracy in order to carryout fusion splicing. An optical fiber needs, therefore,excess length part of it adding with practically using part. Especially in optical communication equipment such as an optical amplifier where a number of optical fibers are wired and spliced, it is necessary to efficiently house the excess length parts of the number of optical fibers in a limited space. And therefore various storage cases for excess length part of an optical fiber have been proposed.

For example, Japanese Laid-Open Patent Publication 174238/1999 discloses a storage case for an optical fiber fusion splicing part. FIG. 24 and FIG. 25 are oblique drawings showing a condition of using a storage case for the fusion splicing part of an optical fiber. In the drawings, numeral 101 is a case body, numeral 102 is a lid, numeral 103 is a take-up member, numerals 104 and 106 are through holes, numerals 105 and 107 are introduction openings, and numeral 108 is a rotary disc. Numeral 10 is a reinforce sleeve, and the reinforce sleeve 10 is generally used to cover the surrounding of fused end parts of optical fibers which are spliced by facing their end parts to another fiber's end parts. Numerals 14 and 15 are take-up holes, numeral 16 is a holding sheet, numeral 17 is a cut line of the holding sheet 16, and L is a core, i.e., an optical fiber.

The take-up member 103 has a groove at a center portion in which the sleeve can be inserted only from one side, to fit a reinforce sleeve 10(not shown in the drawings, but is located at the same position of the reinforce sleeve 10). And the take-up member 103 including two take-up parts having outer circumferential take-up face with a radius of curvature not less than the bend minimum radius of the core L.

The rotary disc 108 has an outsider diameter larger than the major axis of the take-up member 103 and is formed integrally to have the same axis as the take-up member 103, on a face opposite to the opening side of the groove to fit a reinforce sleeve 10.

The holding sheet 16 is divided into two sheets at the center portion and having external configuration larger than that of the take-up member 103. And the holding sheet 16 is stuck to the take-up member 103 at the opening side of the groove to fit a reinforce sleeve 10.

The take-up holes 14 and 15 are forming of a pair of through halls of the rotary disc 108, forming on the two take-up parts of the take-up member 103 with the groove to fit a reinforce sleeve 10 as the center.

The case body 101 and the lid 102 are made to removable from each other. The case body 101 has a core introduction opening 105 and the lid 102 has a core introduction opening 107. And the introduction openings 105 and 107 are made on outer circumferential portions in a tangent direction of the case body 101 and the lid 102 respectively. In a storage portion, comprising the case body 101 and the lid 102, the take-up member 103 is rotatably stored.

Excess length parts of optical fibers including a fusion splicing part are stored in this storage case for a fusion splicing part of an optical fiber as described below. First, as shown in FIG. 24, the lid 102 of the storage case is opened and the slide disk 108 comprising the take-up member 103 is taken out. Then, the reinforce sleeve 10 serving as the fusion splicing part of the core L is inserted from the cut line 17 of the holding sheet 16 which is on the take-up member 103 and is fixed at the reinforcing sleeve fitting groove.

Next, as shown in FIG. 25, the cores L extending from the end portions of the reinforce sleeve 10 are placed inside through the introduction openings 105, and the lid 102 is closed. Then, with the storage case held, the rotary disc 108 is rotated in a take-up direction utilizing the take-up holes 14, 15. Thus, the cores L are retracted from the introduction openings 105, 107 successively, and the excess length parts of the cores(optical fibers) L come to be stored in the case.

However, in the above mentioned conventional storage case for a fusion splicing part of an optical fiber, the reinforce sleeve 10 serving as the fusion splicing part is fixed into the case. It is, therefore, essential that the difference between the excess lengths of the optical fibers on both sides of the reinforce sleeve 10 are a predetermined length. In other words, if the difference between the excess lengths of the optical fibers on both sides of the reinforce sleeve 10 are not the predetermined length, one of the excess length parts is not stored in the case and is left outside or one side of the optical fiber is pulled strongly as to break off and another side of the optical fiber can not be pulled sufficiently to store the case.

And yet under normal conditions, the rate of succeeding in fusion splicing of optical fibers (the rate of succeeding in fusion splicing in the first attempt and going straight to the next process) is not always 100%. In most cases, it is necessary to cut and fuse again the fusion portion, and actually it is almost impossible to accurately determine the excess lengths of the optical fibers.

Moreover, in the conventional storage case for excess length part of an optical fiber, to store excess length parts of optical fibers with a number of the reinforce sleeve 10, the same numbers of the case bodies 101, 102 are required. Therefore, it is necessary that a thickness of each case body 101, 102 is larger than a diameter of the reinforce sleeve 10 and, as a result, a large storing space is required.

The present invention was made to solve the above mentioned problems incidental to the prior art and to provide a compact storage case for excess length part of an optical fiber, even if the excess lengths of an optical fiber is not determined, optical fibers are neatly stored without being left outside.

SUMMARY OF THE INVENTION

An optical fiber reel according to the present invention, which is a reel for storing an optical fiber, comprises two optical fiber take-up members taking up an optical fiber and two flat plate like frame members sandwiching the two optical fiber take-up members between them, the two flat plate like frame members, covering the two optical fiber take-up members, having external circumferential configuration of which diameter is larger than diameter of a circumscribed circle of the two optical take-up members by not less than three times of d of diameter of the optical fiber, and arranged facing each other to make a gap not less than d but less than 2d, each of the two optical fiber take-up members having an external circumferential take-up face and a pair of outer surfaces, and arranged as the pair of outer surfaces being parallel to a flat plate face of the frame members to make a gap of not less than d between each other external circumferential take-up faces of the take-up members, the external circumference of the plane like frame members and external circumferential take-up faces of the optical fiber take-up members constituting to make a gap of not less than d between them.

It is preferable that center point of the frame members having the circular outer circumferential configuration is located to coincide with a point of symmetry of the optical fiber take-up members.

It is also preferable that each optical fiber reel has a construction in which two discs, having projections as the optical fiber take-up members, can be joined at each other projections.

It is also preferable that the outer circumference of the optical fiber take-up member is circular.

It is also preferable that the outer circumferential configuration of the optical fiber take-up members comprises: two first convex circular arcs which are located from the vicinity of center point of the frame members to the outer circumferential portion and have a radius R of less than one quarter of the diameter of the frame member; a concave circular arc which extends from a side end portion of the center point of one of said first convex circular arcs along the neighboring other first convex circular arc and has a radius of not less than R+d; and a curve which includes a second convex circular arc having a radius of not less than 2R and connects an outer circumferential side end portion of the frame member of said concave circular arc and an outer circumferential side end portion of the frame member of said first convex circular arc.

It is also preferable that the frame members are 0.1 mm to 0.3 mm in thickness.

It is also preferable that the rotation locking mechanism comprises a lid which pushes the stacked optical fiber reels in a stacking direction and a pillar member which pushes a part of the outer circumferences of the frame members of the stacked optical fiber reels, stacking from the introduction opening formed on an outer circumferential portion of the case body, toward the center point.

DETAILED DESCRIPTION OF THE PREFERRED EMBODIMENT

Embodiment 1

A preferred embodiment of the present invention is hereinafter described with reference to the accompanying drawing.

Figure 1:
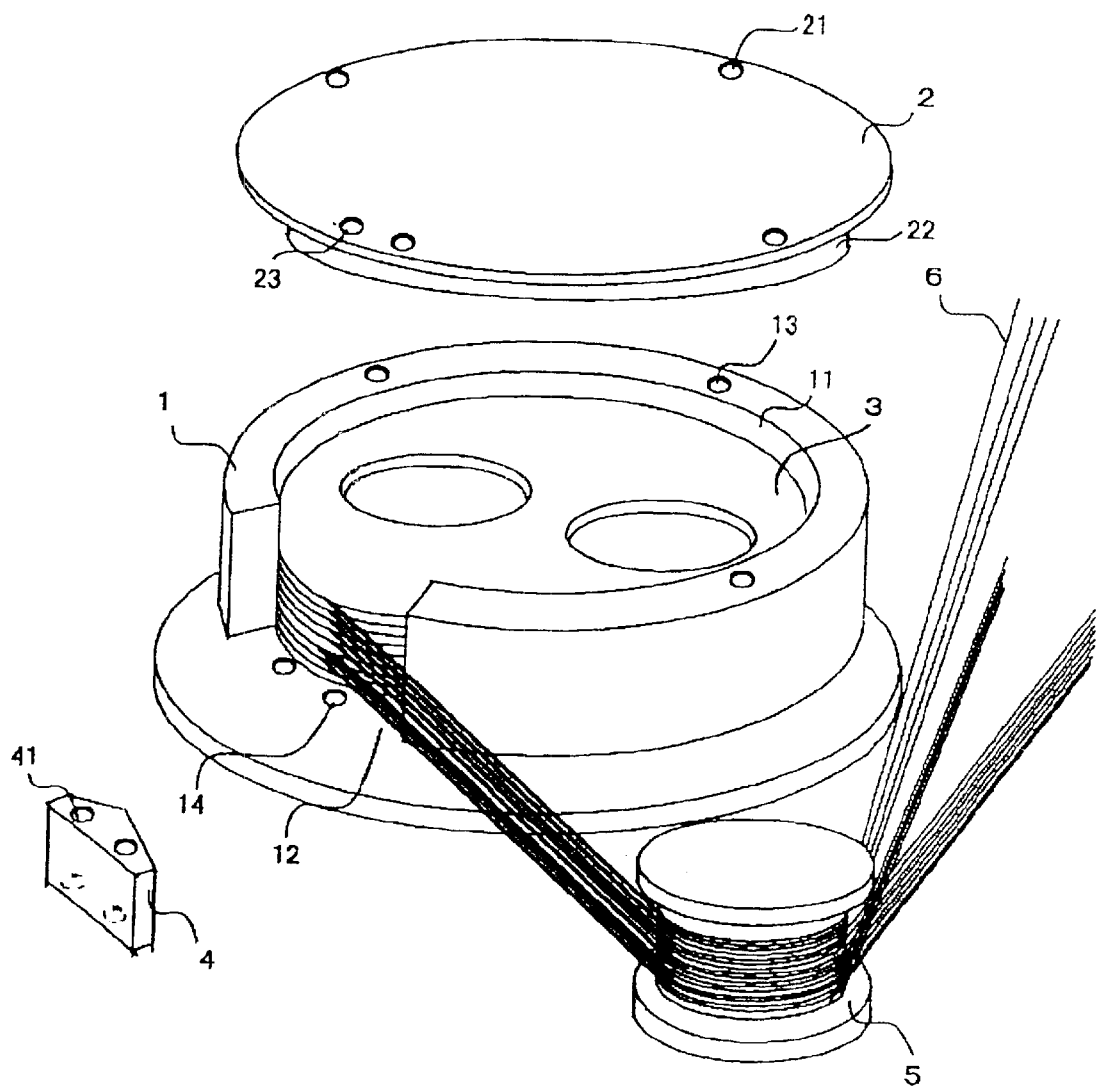
FIG. 1 and FIG. 22 are oblique drawings showing the storage case for storing an optical fiber of the present invention.

FIG. 1 is a view showing the storage case for storing an optical fiber according to the present invention, and is specifically a oblique drawing showing a state of using the case. In the drawing, numeral 1 indicates a case body, numeral 2 indicates a lid of the case body, and numeral 3 indicates optical fiber reels stacked up and stored in the case body 1. The case body 1 is shaped into a cylinder with an inner face 11 having a diameter larger than diameters of the plural optical fiber reels 3, and an introduction opening 12 for introducing optical fibers 6 is formed on the outer circumferential portion. Numeral 4 indicates a pillar member for pushing a part of outer circumferences of the plural optical fiber reels 3 stacked up and stored in the case body 1 from the introduction opening 12 toward the center of the case. In this embodiment, a rotation locking mechanism for fixing rotation of the optical fiber reels 3 stored in the case body 1 comprises the lid 2 and the pillar member 4. Numeral 5 indicates a bobbin for bending the optical fibers 6 introduced from various directions toward the introduction opening 12. Numerals 13, 14, 21, 23, and 41 indicate screw holes formed on the case body 1, lid 2, and pillar member 4, respectively. Numeral 22 indicates a convexity formed on the lid 2 and inserted in the case body 1. Numeral 34b indicates a concavity described later in detail.

The case body 1, lid 2, pillar member 4 and bobbin 5 are made of, for example, plastic such as ABS resin, a galvanized iron material, and so on.

Each of the following embodiments is described supposing that each of the optical fibers 6 to be stored is φ0.6 mm in diameter d, however, it is to be noted that d is not limited to φ0.6 mm as a matter of course.

Figure 2:
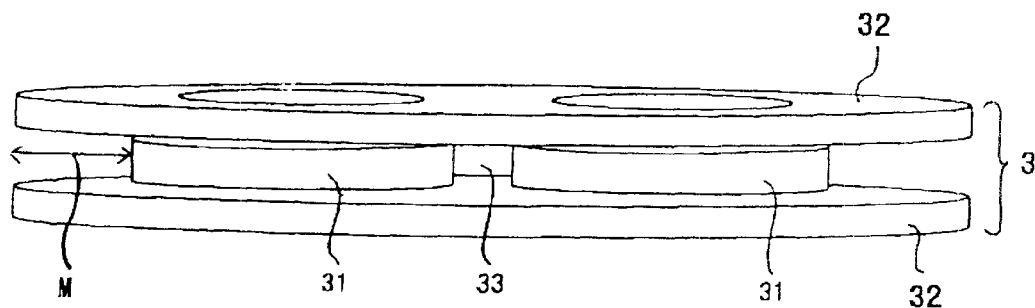
FIGS. 2, 5 and 13 are oblique drawings each showing an optical fiber reel for storing an optical fiber of the present invention.
Figure 3:
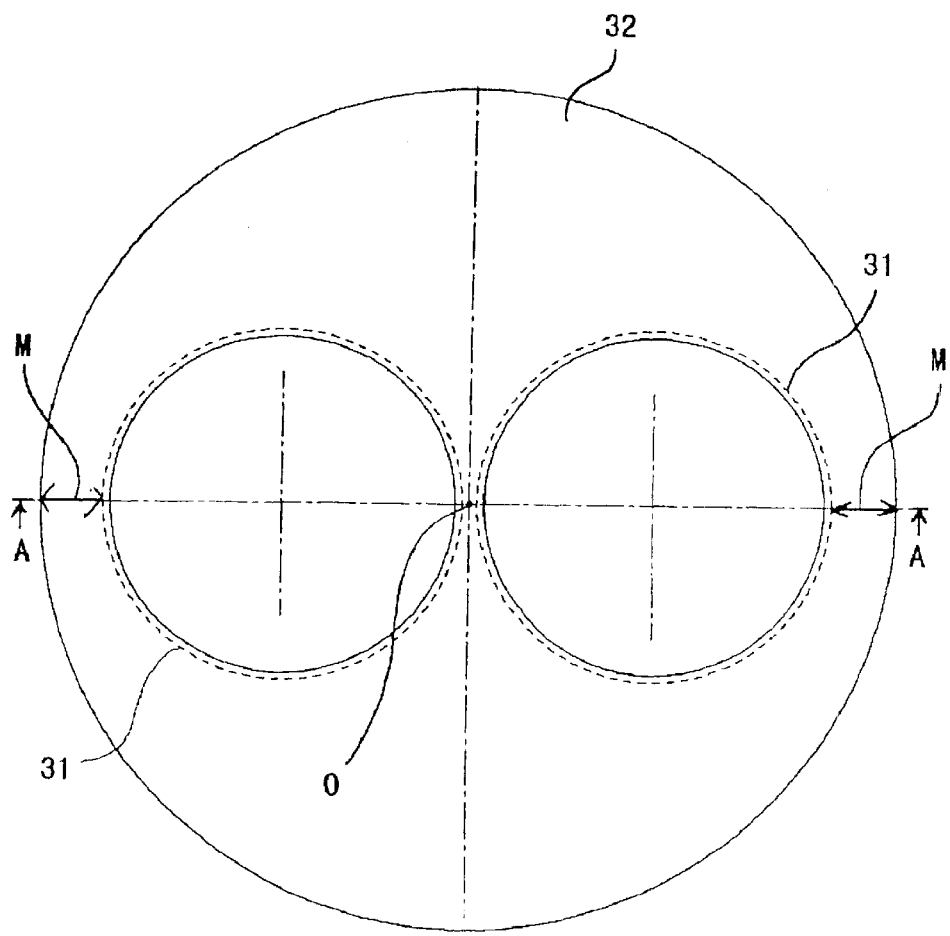
FIGS. 3, 7, 9, 11, 14, 16, 18 and 20 are top views each showing an optical fiber reel for storing an optical fiber of the present invention.

FIG. 2 and FIG. 3 are views for showing the optical fiber reel for storing an optical fiber according to the present invention, and more specifically are a perspective view and a top view of the optical fiber reel 3 in FIG. 1, respectively. In the drawings, numeral 31 indicates an optical fiber take-up member which is 0.7 mm in thickness that satisfies a condition of being not less than the diameter d (0.6 mm) of the optical fiber 6 and less than 2d (1.2 mm), and has an outer circumferential configuration of a circle of φ50 mm. Two optical fiber take-up members 31 are arranged in point symmetry on the same plane with a space 33 of 2 mm, which is not less than the diameter d (0.6 mm) of the optical fiber 6, between them.

Reference letter O is the point of symmetry. Numeral 32 indicates a frame member of 0.2 mm in thickness having a circular configuration of an outer circumference of φ110 mm in diameter, and O is also the center point thereof.

The optical fiber reel 3 is formed by coinciding the center point of the frame member 32 having the circular outer circumference with the point of symmetry O of the optical fiber take-up members 31 and is formed integrally with the two optical fiber take-up members 31 sandwiched between the two frame members 32.

A circumscribed circle of the two optical fiber take-up members 31 placed on the same plane has a diameter of 50×2+2=φ102 mm, and therefore the most shallow portion M of a groove for winding the optical fibers 6 around the outer circumferences of the optical fiber take-up members 31 (i.e., the space between the outer circumference of the optical fiber take-up members 31 and the outer circumference of the frame members 32) is (110−102)÷2=4 mm in depth. Thus, maximum number of optical fibers which can be wound around the circumferences of the optical fiber take-up members 31 of this fiber reel 3 is 4÷0.6=6.7, i.e., 6 on one side.

Figure 4:
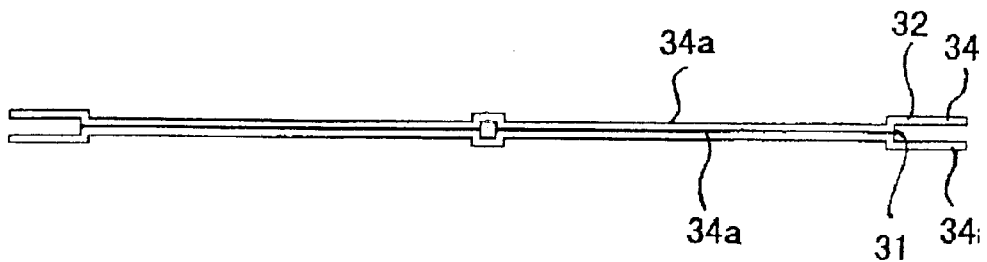
FIGS. 4, 8, 10, 12, 15, 17, 19 and 21 are side sectional views each showing an optical fiber reel for storing an optical fiber of the present invention.
Figure 5:
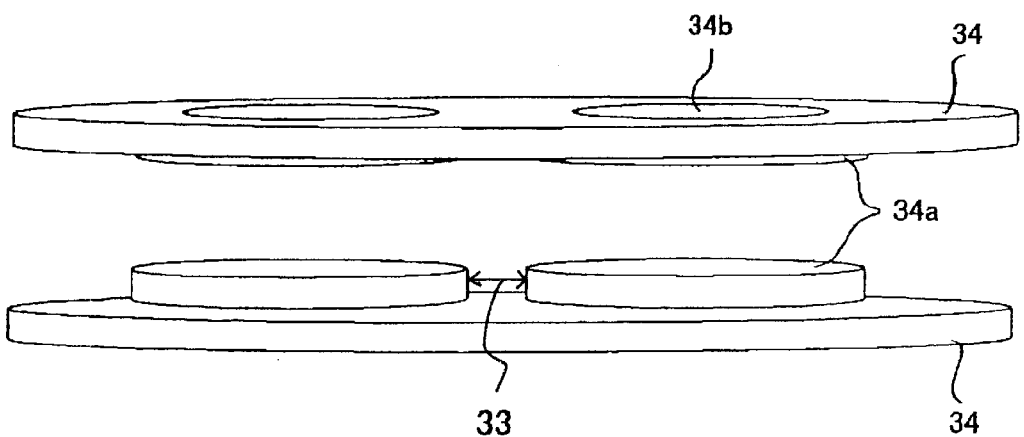

Described below is a method for manufacturing the optical fiber reel 3 as described above. FIG. 4 and FIG. 5 are views showing the optical fiber reel for storing an optical fiber according to the present invention, and more specifically, FIG. 4 is a sectional view taken along the line A—A in FIG. 3, and FIG. 5 is an exploded oblique drawing of the optical fiber reel.

As shown in the drawings, first, a vinyl chloride sheet of 0.2 mm in thickness is formed by vacuum forming to prepare two thin plate members 34 each having two circular convexities (0.35 mm in difference in step) 34a of φ50 mm in outside diameter with the space 33 (2 mm) between them to be a part of the optical fiber take-up members 31. Next, the outer circumferences of these two thin plate members 34 are punched into circles with a press, the projections 34a of these two circular thin plate members 34 are joined together by vacuum heat fusion splicing, whereby the optical fiber reel 3 as shown in FIG. 2 to FIG. 4 is completely obtained. Numeral 34b is a concavity formed on a backside of each convexity 34a.

It is preferable to form a through hole for positioning on the convexity 34a (the backside is the concavity 34b). It is also possible to use the through hole as a hitch for rotating the optical fiber reel 3 in the case body 1 in order to wind the optical fibers 6.

It is preferable to use, for example, PET (polyethylene terephthalate) or the like instead of the vinyl chloride sheet, and it is also preferable to use an adhesive instead of the vacuum heat fusion splicing for joining the thin plate members.

The thickness of the frame members 32, i.e., the thickness of the thin plate members 34 are preferably 0.1 mm to 0.3 mm, because when the thickness is less than 0.1 mm, the frame members are too soft to function as frames and it is difficult to wind the optical fibers 6. On the other hand, when the thickness is more than 0.3 mm, it is difficult to make the case compact.

It is preferable to form the circular convexities 34a by, for example, press molding instead of vacuum forming.

Figure 6:
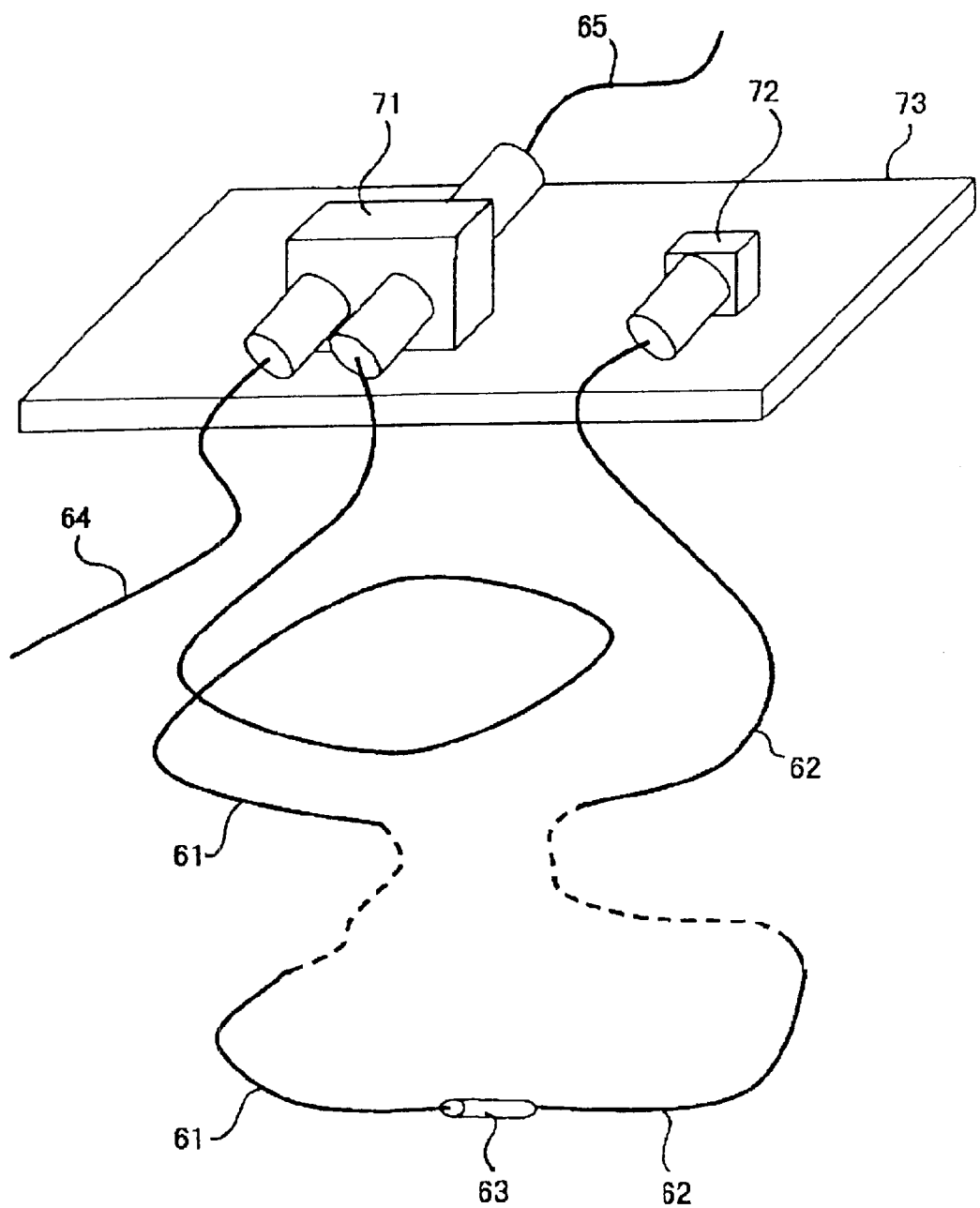
FIG. 6 is a view showing the optical repeater for storing an optical fiber of the present invention.

Described below is a method for using the storage case for an optical fiber according to this embodiment. FIG. 6 is a view showing the optical repeater for storing an optical fiber according to the present invention, and is more specifically a oblique drawing for explaining a part of the inside of an optical communication equipment such as a light amplifier. In the drawing, numeral 71 is an optical part provided with optical fibers 61, 64, 65, and numeral 72 is an optical part provided with an optical fiber 62. Numeral 73 is a chassis for fixing the optical parts 71 and 72. The optical fibers 61, 62 are spliced through fusion splicing, and numeral 63 is a fusion point. In the drawing, the fusion point 63 possesses a reinforcing sleeve around it.

To use the storage case for excess length part of an optical fiber according to this embodiment, first, before fusing the optical fibers 61, 62, each of these optical fibers 61, 62 is passed through the space 33 at the center of a different optical fiber reel 3. Then, end portions of the optical fibers 61, 62 are respectively set to a fusing apparatus and fusion splicing is conducted. Next, the formed fusion point 63 is fixed at a predetermined position (not shown in the drawing) in the chassis 73. The optical fiber reel 3, through which the optical fiber 61 splicing the optical part 71 and the fusion point 63 passes, is constructing as shown in FIG. 7 and FIG. 8.

Figure 7:
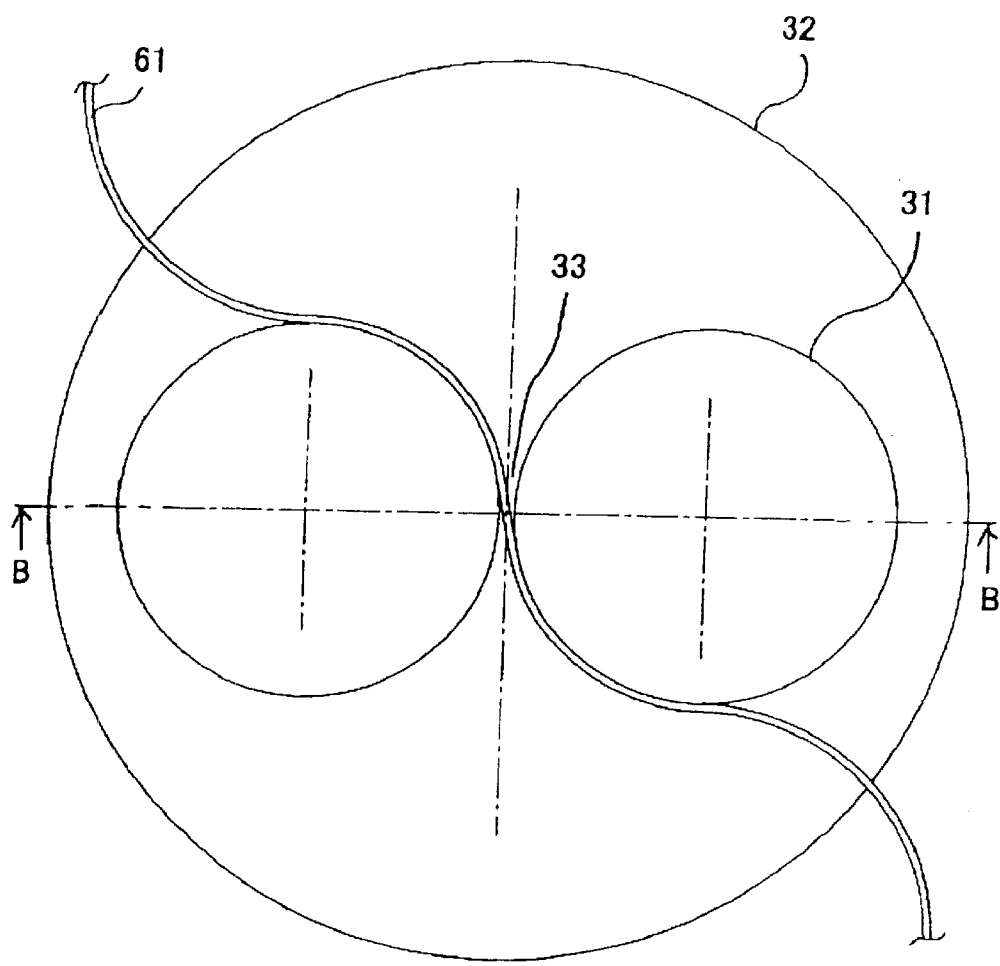
Figure 8:
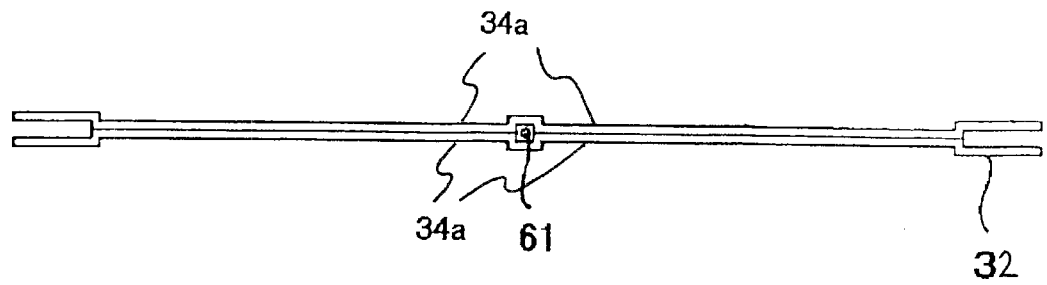

FIG. 7 and FIG. 8 are views showing the optical fiber reel for storing an optical fiber according to the present invention. More specifically, FIG. 7 is a top view showing the optical fiber reel with an upper thin plate member removed for easy understanding, and FIG. 8 is a sectional view taken along the line B–B in FIG. 7 showing an original state without removing the upper thin plate member 34. Likewise in FIGS. 9 and 10, in FIGS. 11 and 12, in FIGS. 16 and 17, in FIGS. 18 and 19, and in FIGS. 20 and 21 described later, FIGS. 9, 11, 16, 18, and 20 are respectively top views showing the optical fiber reel with the upper thin plate member removed for easy understanding. On the other hand, FIGS. 10, 12, 17, 19, and 21 are side sectional views cutting FIGS. 9, 11, 16, 18, and 20 respectively at the same position with FIG. 8, and are side sectional views showing an original state without removing the upper thin plate member 34 in FIGS. 9, 11, 16, 18, and 20 respectively. Hatching of the optical fiber reel 3 and the optical fiber 61 are omitted in FIG. 8 because it is easier to understand the drawing without hatching. The same procedures are applied to FIGS. 10, 12, 15, 17, 19, and 21 described later.

Described below is a manner of storing this optical fiber 61. First, a length of the optical fiber 61 from the optical fiber reel 3 to the optical part 71 and a length of the optical fiber from the optical fiber reel 3 to the fusion point 63 are adjusted to have a predetermined difference by sliding the optical fiber 61. Under this condition, the optical fiber reel 3 is put into the case body 1 of which positional relation with the chassis 73 is fixed. At this time, the optical fiber 61 is kept to pass through the introduction opening 12 of the case body 1 via the bobbin 5.

Figure 9:
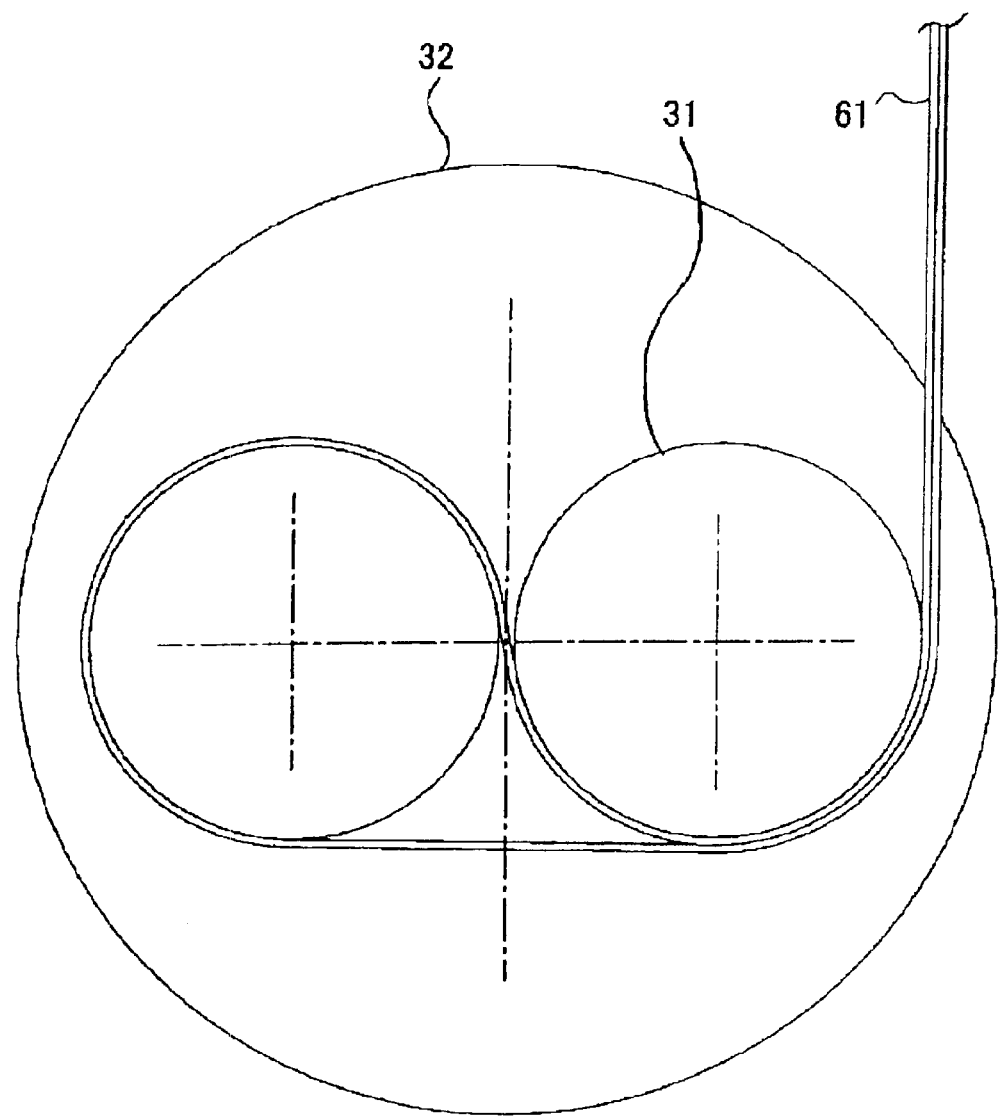
Figure 10:
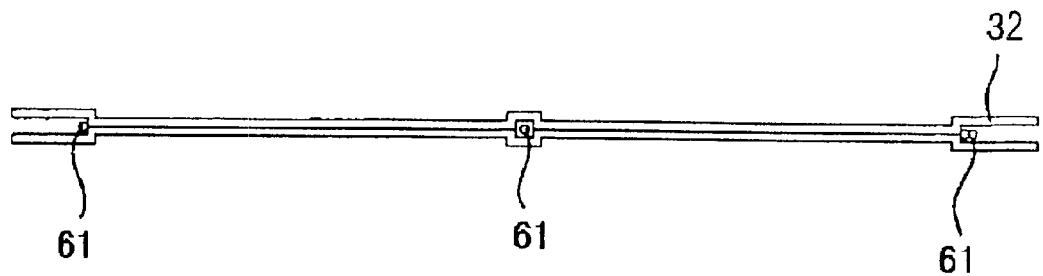
Figure 11:
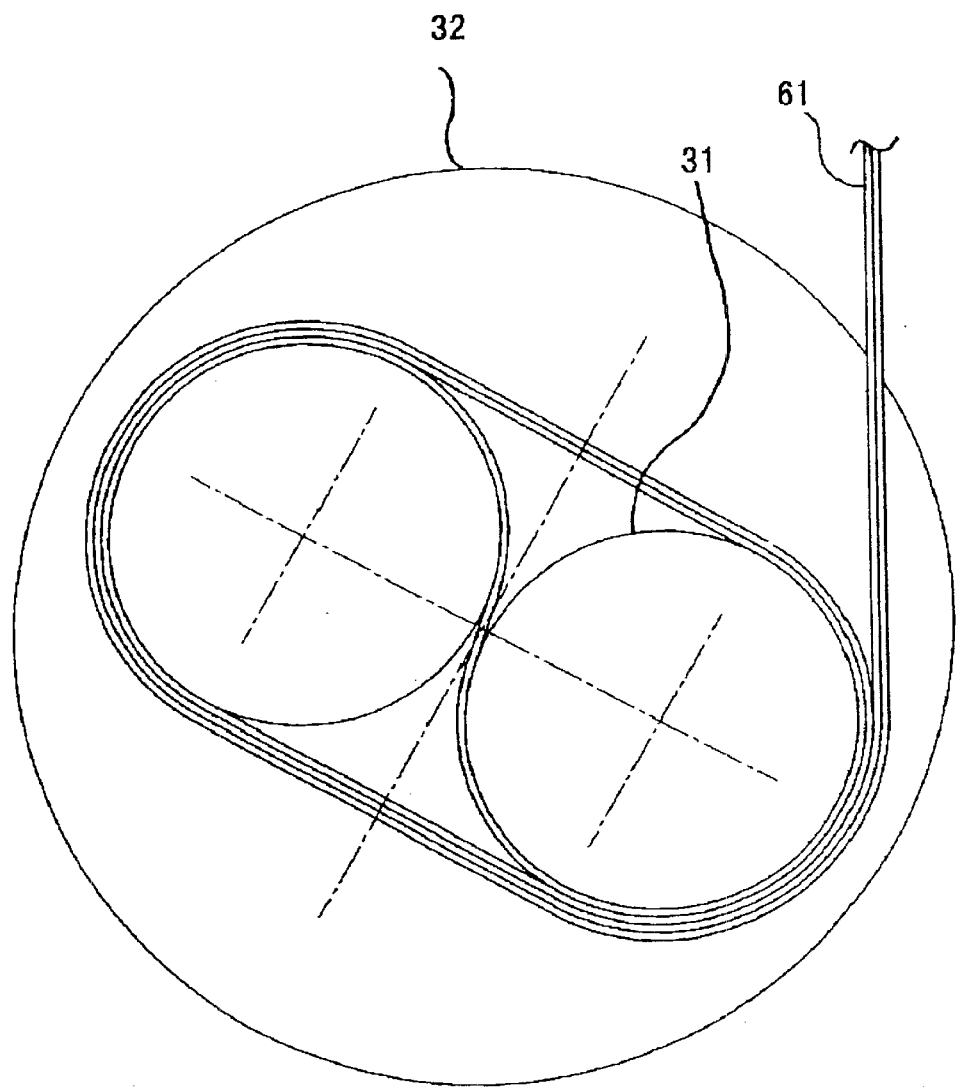
Figure 12:
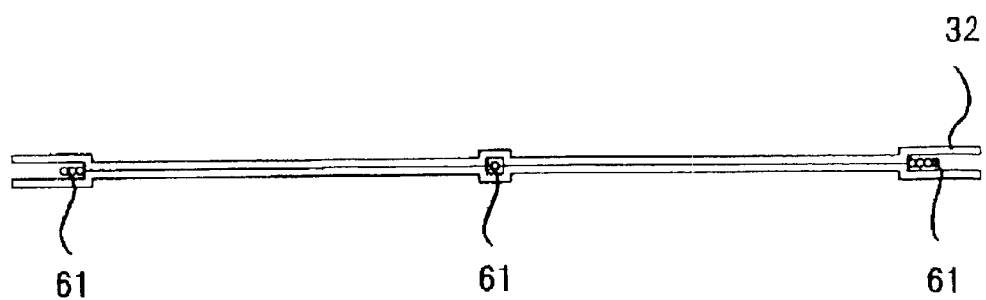

Next, this optical fiber reel 3 is rotated in the case body 1 utilizing, for example, the recession 34b, thereby taking up the optical fiber 61. FIG. 9 to FIG. 12 are views showing the optical fiber reel for storing an optical fiber according to the present invention. More specifically, FIG. 9 and FIG. 10 are a top view and a side sectional view each showing a condition in which the optical fiber reel 3 is rotated one turn. FIG. 11 and FIG. 12 are a top view and a side sectional view showing a condition in which the optical fiber reel 3 is rotated two turns and 30°. The optical fiber 61 is thus stored without slack even when the excess length of the optical fiber 61 is undetermined.

As described above, the optical fiber take-up members 31 of the optical fiber reels 3 are 0.7 mm in thickness, and therefore the optical fiber 61 of φ0.6 mm is wound in a well-ordered manner of forming one layer.

The outer circumferential configurations of the optical fiber take-up members 31 are circles of 50 mm in diameter, and FIG. 11 clearly shows that curvature of the wound optical fiber 61 is not less than R25 at all portions, and never below R25. This is the generally established allowable curvature of optical fiber. The bobbin 5 is also a circle of 50 mm in diameter.

Then, in the same manner, the optical fiber 62 wound around another optical fiber reel 3 is stored in the case body 1. The remaining optical fibers 63, 64 are also handled in the same manner, and all the plural optical fibers 6 wound around the plural optical fiber reels 3 are stacked and stored in the case body 1.

Next, as shown in FIG. 1, the lid 2 pushes the stacked optical fiber reels 3 from above to the stacking direction, and under this condition, the case body 1 and the lid 2 are fixed by piercing each of the screw holes 13 and 21 with a screw. At this time, when the height of the stacked optical fiber reels 3 is lower than the case body 1 as shown in FIG. 1, a convexity 22 is formed on the lid 2 and the convexity 22 pushes the optical fiber reels 3 from above to the piling direction. The convexity 22 is not always necessary when the height of the stacked optical fiber reels 3 is higher than the case body 1.

The pillar member 4 is subsequently placed at the introduction opening 12 and pushes a part of the outer circumference of the frame member 32, i.e., the outer circumference of the optical fiber reel 3, toward the center of the case, i.e., toward the center point of the frame members 32. Under this condition, the pillar member 4 and the case body 1 and the lid 2 are fixed by passing a screw through each of the screw holes 41, 14.

The outer circumferential portions of the optical fiber reels 3, i.e. the frame members 32 is made of a thin plate of 0.2 mm in thickness, and is transformed when it is pushed toward the center of the case by the pillar member 4, and the rotation is thus locked.

As described above, the rotation of the optical fiber reels 3 stacked up and stored in the case body 1 is locked, and storing operation of the excess length parts of the optical fibers is completed.

The forming method of the optical fiber reel of the present invention is not limited to the above embodiment. For example, in place of using two-flat sheet each having two circular convexities, a flat sheet having two circular convexities and a flat sheet having no convexity may be combined to provide the optical fiber reel. In this case, the circular convexities have the same shape as the take-up members to be formed. Alternatively, two flat sheet each having a circular convexity may mutually be combined as the gap between the circular convexities being a range from d to 2d, to provide the optical fiber reel of the present invention.

Embodiment 2

Figure 13:
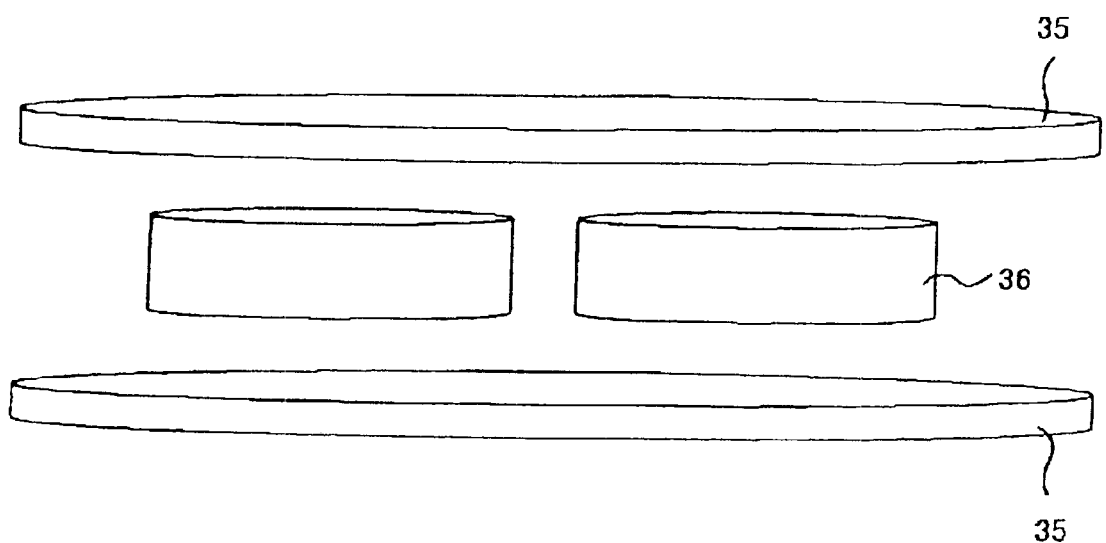

FIG. 13 is a view showing the optical fiber reel for storing an optical fiber according to the present invention, and is more specifically an exploded oblique drawing showing a construction of each of the optical fiber reels. The other portion of the construction is the same as that in Embodiment 1. In this embodiment, two vinyl chloride discs 36 (correspondent with the optical fiber take-up members 31) of 0.7 mm in thickness and φ50 mm in outside diameter are sandwiched between two vinyl chloride discs 35 (correspondent with the frame members 32) of 0.2 mm in thickness and φ110 mm in diameter, and are subject to a vacuum heat bonding. Thus each of the optical fiber reels 3 is prepared.

In this embodiment, more parts and more processes are required as compared with those in Embodiment 1, which raises the manufacturing cost a little. However, this embodiment is effective in improving accuracy of the thickness 0.7 mm of the optical fiber take-up members 31 as compared with that in Embodiment 1.

The material of the discs 35 and 36 is not limited to vinyl chloride, and other materials such as PET are also preferable. It is further possible to conduct the joining with, for example, an adhesive.

Each of the foregoing embodiments shows a construction in which the outer circumferential configuration of each optical fiber take-up member 31 of the optical fiber reel 3 is a circle of 50 mm in diameter. However, the invention is not limited to such a construction, and any circle of not less than 50 mm in diameter is preferable because it is generally said that the allowable curvature of optical fiber is R25. The same applies to the bobbin 5.

Embodiment 3

Figure 14:
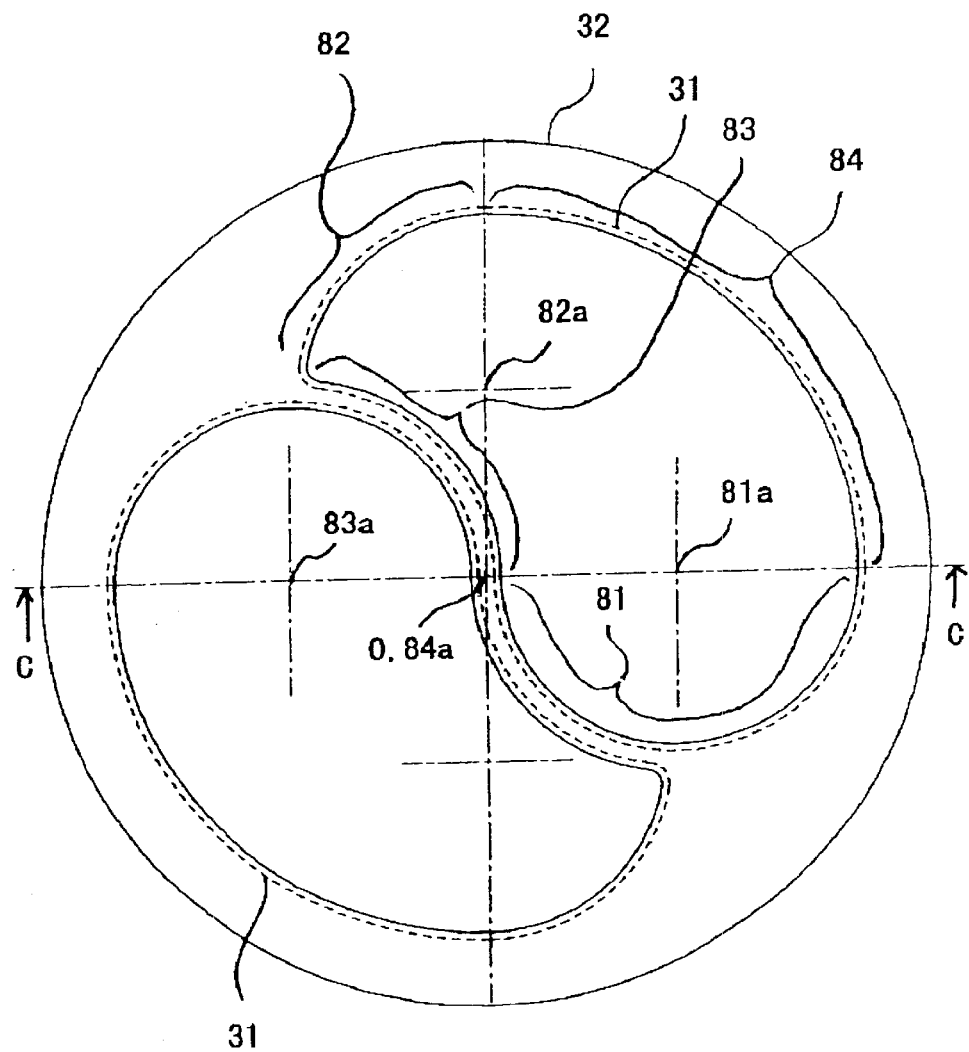
Figure 15:
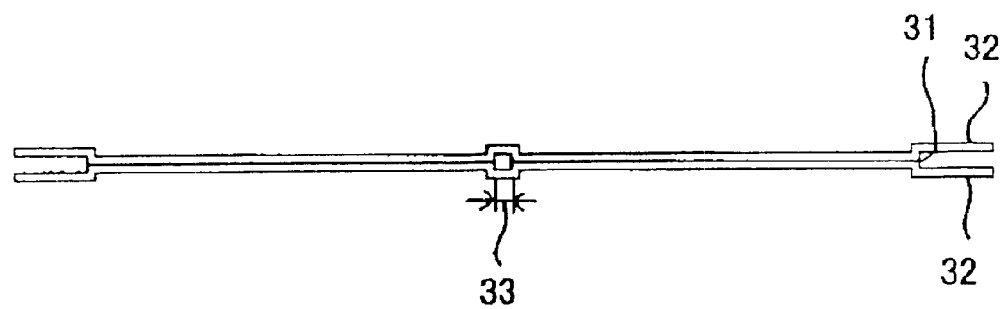

FIG. 14 and FIG. 15 are views showing the optical fiber reel for storing an optical fiber according to the present invention, and are more specifically a top view showing a construction of the optical fiber reel and a sectional view thereof taken along the line C—C. The other portion of the construction is the same as that in the foregoing Embodiment 1. In the drawing, broken line regions 81 and 82 are respectively first and third convex circular arcs of R25, and numerals 81a and 82a are center points of the convex circular arcs respectively. A broken line region 83 is a concave circular arc of R27, and numeral 83a is a center point of the concave circular arc. A broken line region 84 is a second convex circular arc of R51, and numeral 84a is a center point of the convex circular arc.

The outer circumferential configuration of each frame member 32 is a circle of 110 mm in diameter as well as in the foregoing embodiment 1, and the two optical fiber take-up members 31 are placed in point symmetry on the same plane at a distance of 2 mm between each other. Each of the center points 81a, 82a and 83a is located 26 mm away from the center point (i.e., the point of symmetry of the two optical fiber take-up members 31) O of the frame member 32. The center point 81a, the center point 83a and the center point (the point of symmetry) O are on one straight line, i.e., on the same diameter of the frame member 32. The center point 82a and the center point (the point of symmetry) O are on a straight line (a diameter) crossing the straight line on which the center point 81a and the center point 83a are located at right angles. The center point 84a is on the center point (the point of symmetry) O.

In this embodiment, the outer circumferential configuration of the optical fiber take-up members 31 is shaped into two huge commas so united as to make a perfect circle, in each of which the convex circular arc portions 81, 82 of R25, the concave circular arc portion 83 of R27, and the convex circular arc portion 84 of R51 are continuously connected. In other words, the outer circumferential configuration of the optical fiber take-up members 31 is formed of: two first convex circular arcs 81 each of which is located from the vicinity of the center point O of the frame member 32 to the outer circumferential portion and of which radius R is 25 mm and less than one quarter of the diameter 110 mm of the frame member; the concave circular arc 83 of which radius is 27 mm and not less than R (25 mm)+d (0.6 mm) and which extends from a side end portion of the center point O of one of the first convex circular arcs 81 along the other neighboring first convex circular arc 81; and a curve of which radius is not less than 2R (50 mm), and which includes the second convex circular arc 84 of 51 mm and connects a frame member 32 outer circumferential side end portion of the concave circular arc 83 and a frame member outer circumferential side end portion of the first convex circular arc 81. In FIG. 14, the mentioned curve connecting the frame member 32 outer circumferential side end portion of the concave circular arc 83 and the frame member outer circumferential side end portion of the first convex circular arc 81 is formed of the second convex circular arc 84 and the third convex circular arc 82.

Figure 16:
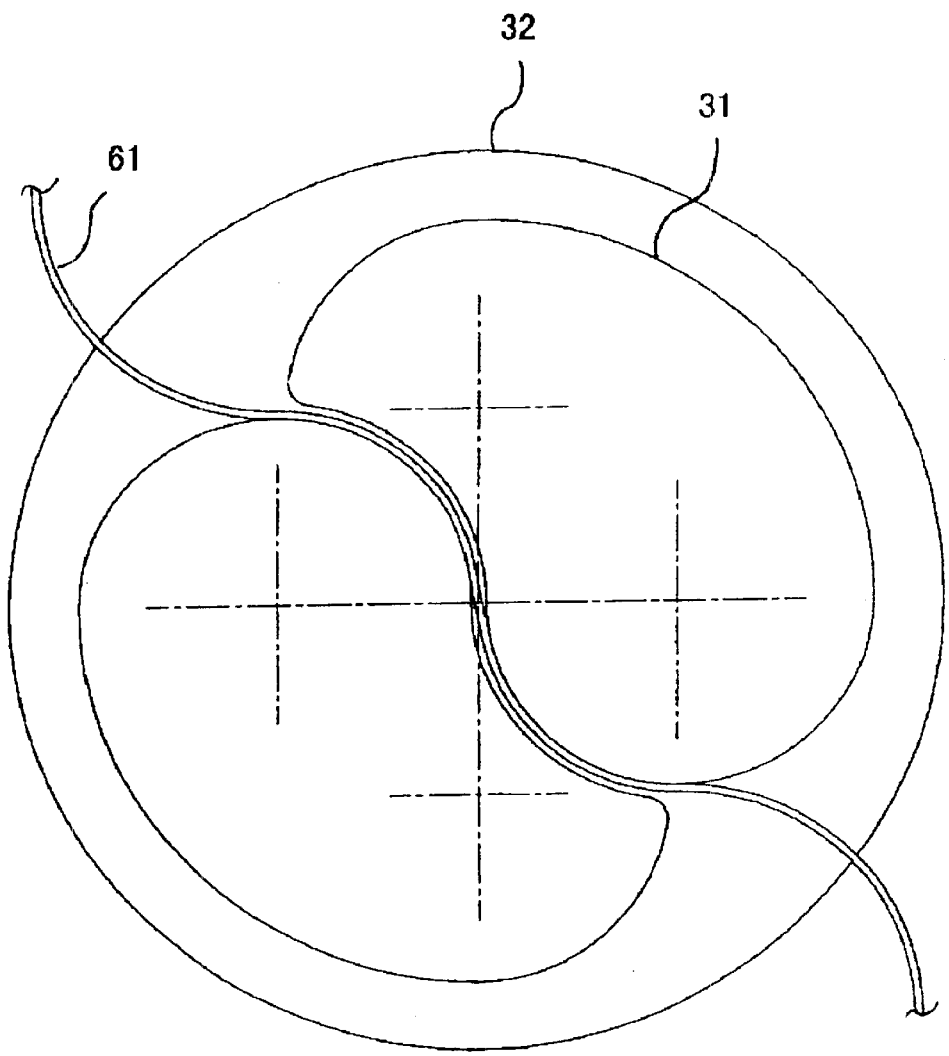
Figure 17:
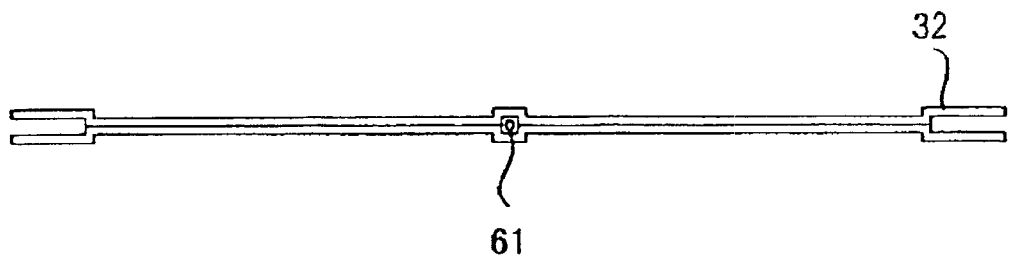
Figure 18:
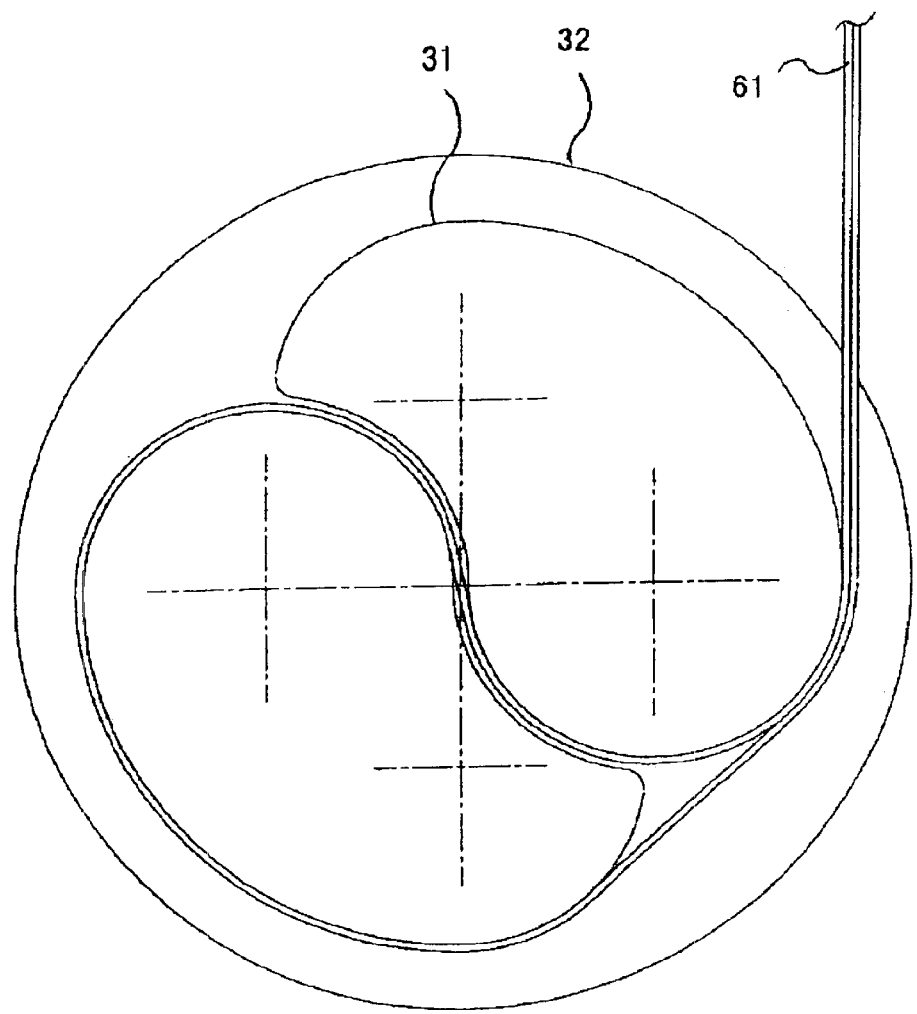
Figure 19:
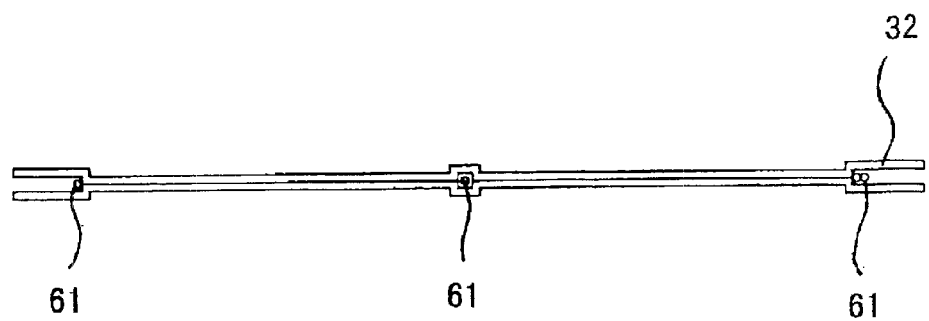
Figure 20:
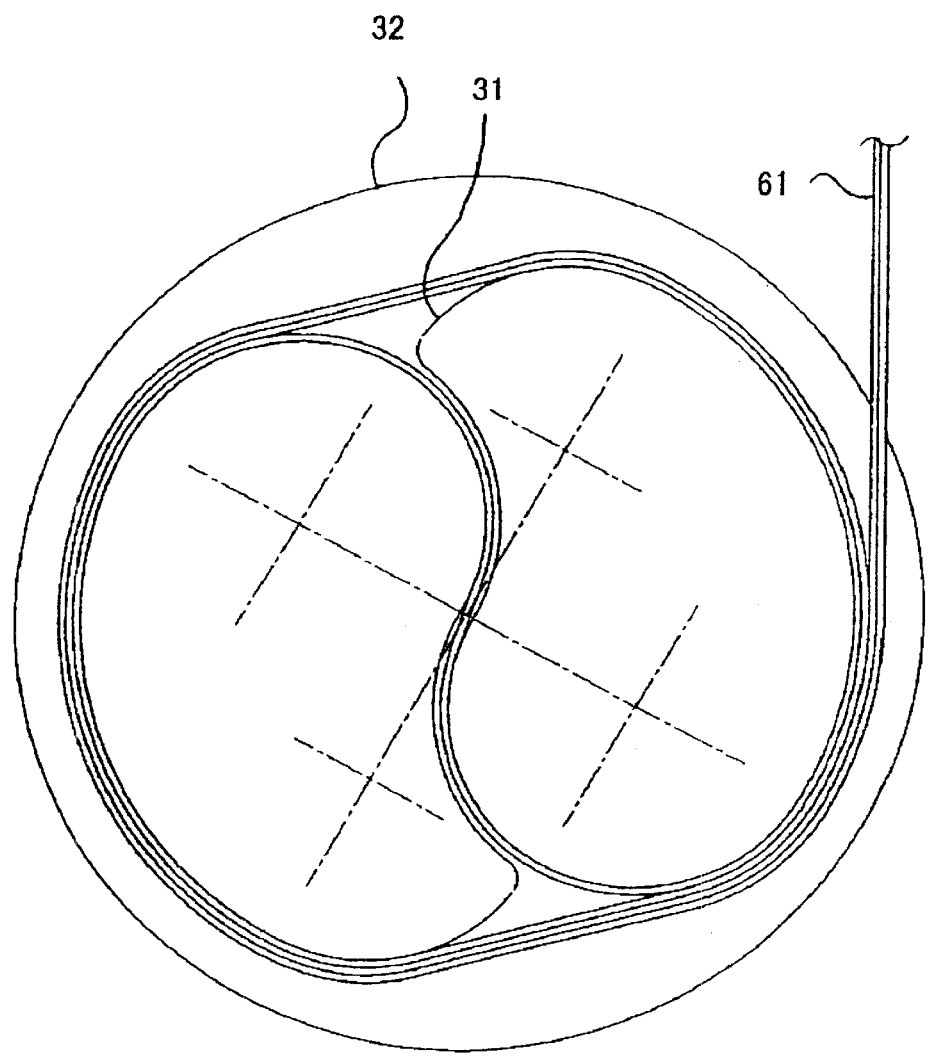
Figure 21:
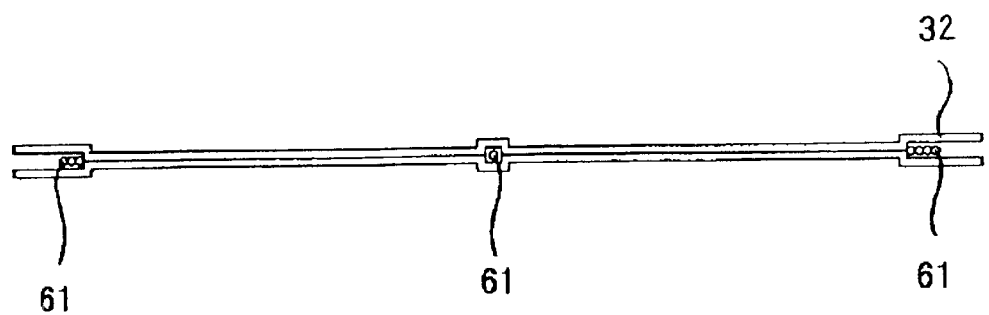

FIGS. 16, 17, 18, 19, 20 and 21 are views showing a manner of storing the optical fiber 61 using the optical fiber reel for storing an optical fiber according to the present invention, each corresponding to FIGS. 7, 8, 9, 10, 11 and 12 in the foregoing Embodiment 1. FIGS. 16, 18 and 20 are top views, and FIGS. 17, 19 and 21 are side sectional views. It is clearly understood from these drawings that curvature of the wound optical fiber 61 is not less than R25 in all portions and is never below R25. This is the allowable curvature of optical fiber also in this embodiment.

Note that this embodiment is especially effective in winding a large amount of optical fibers 6 in the same number of rotation as compared with the optical fiber reels 3 in Embodiment 1.

Figure 24:
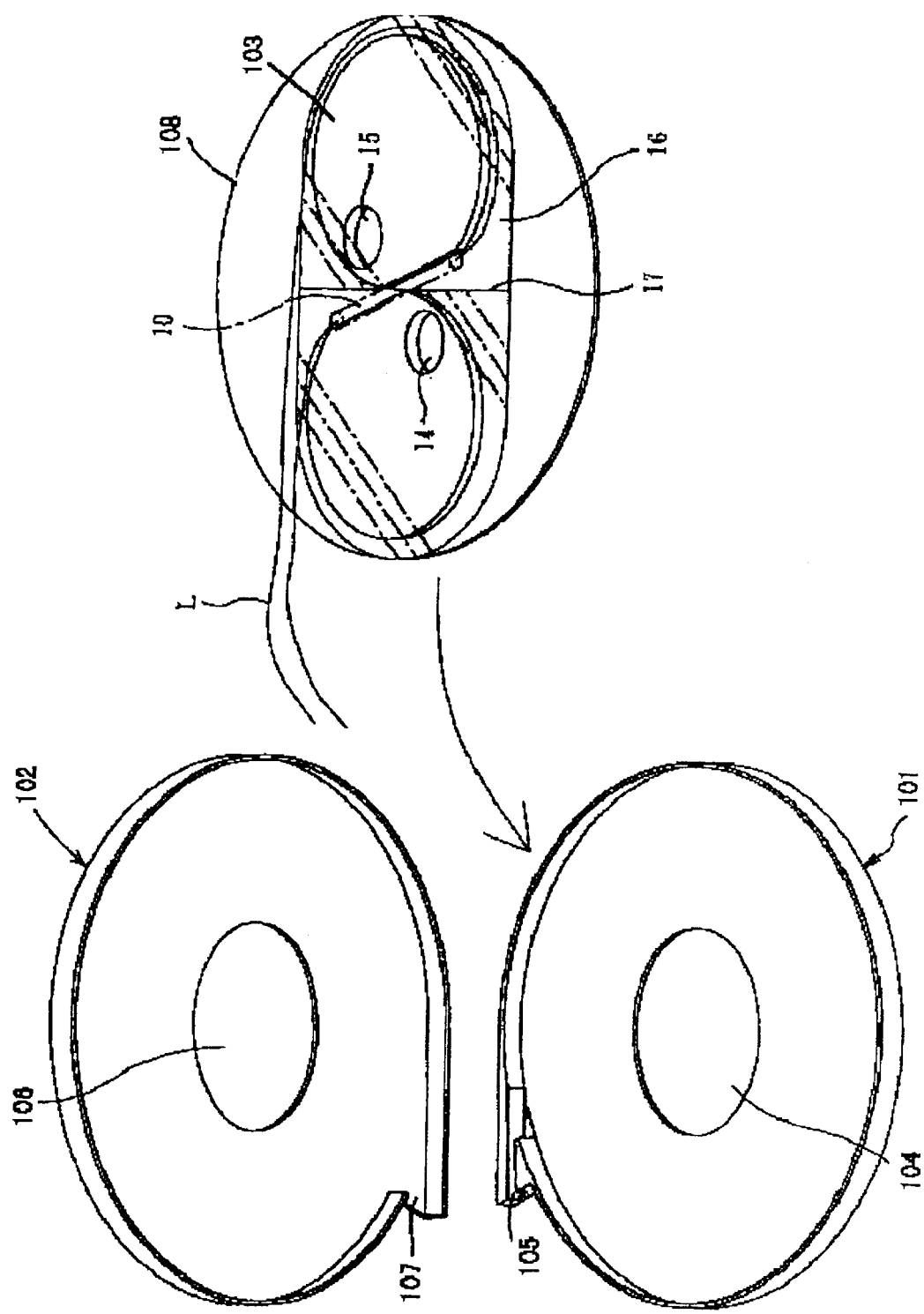
FIG. 24 and FIG. 25 are oblique drawings each showing a conventional storage case for excess length part of an optical fiber
Figure 25:
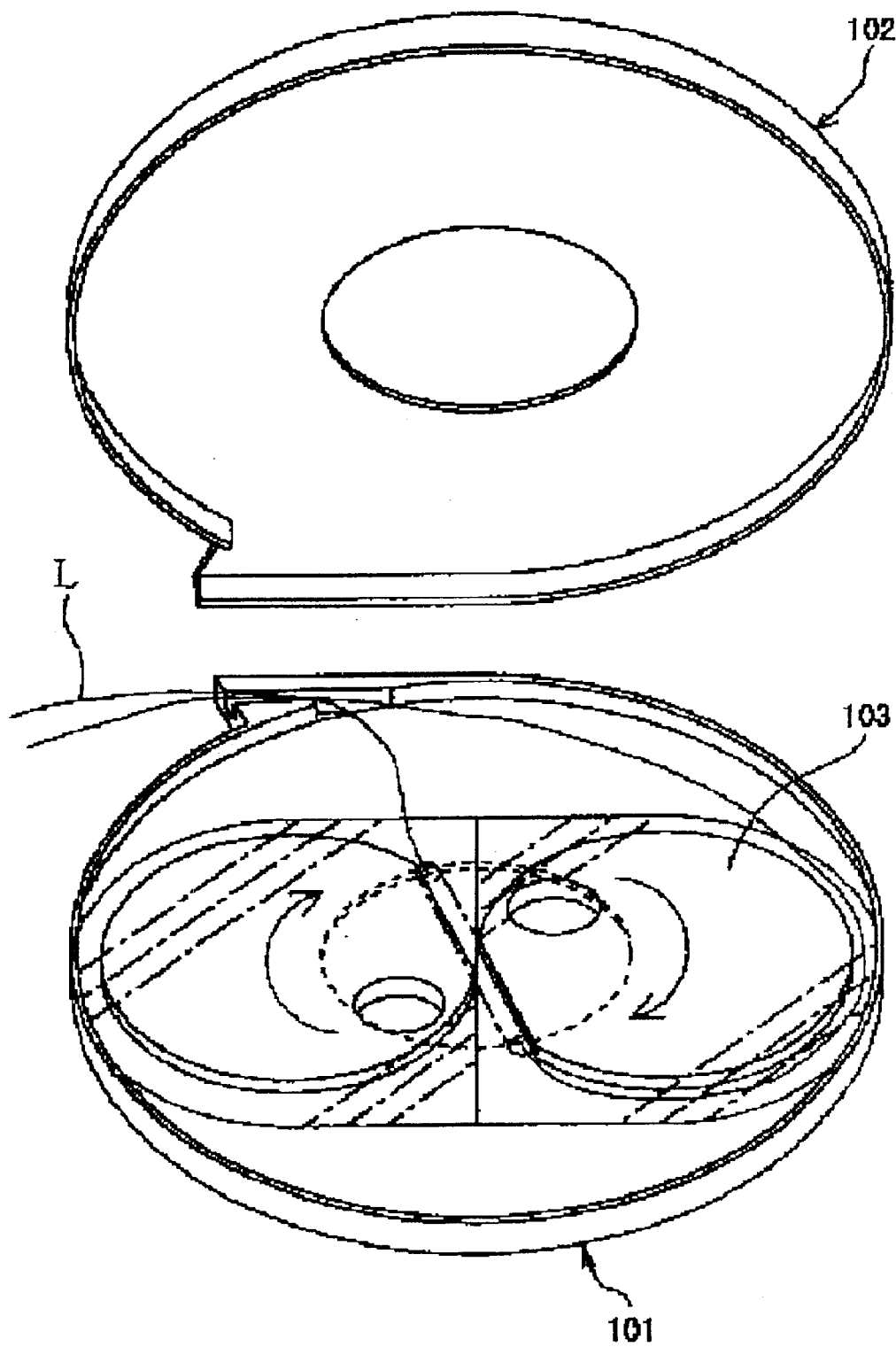
Figure 26:
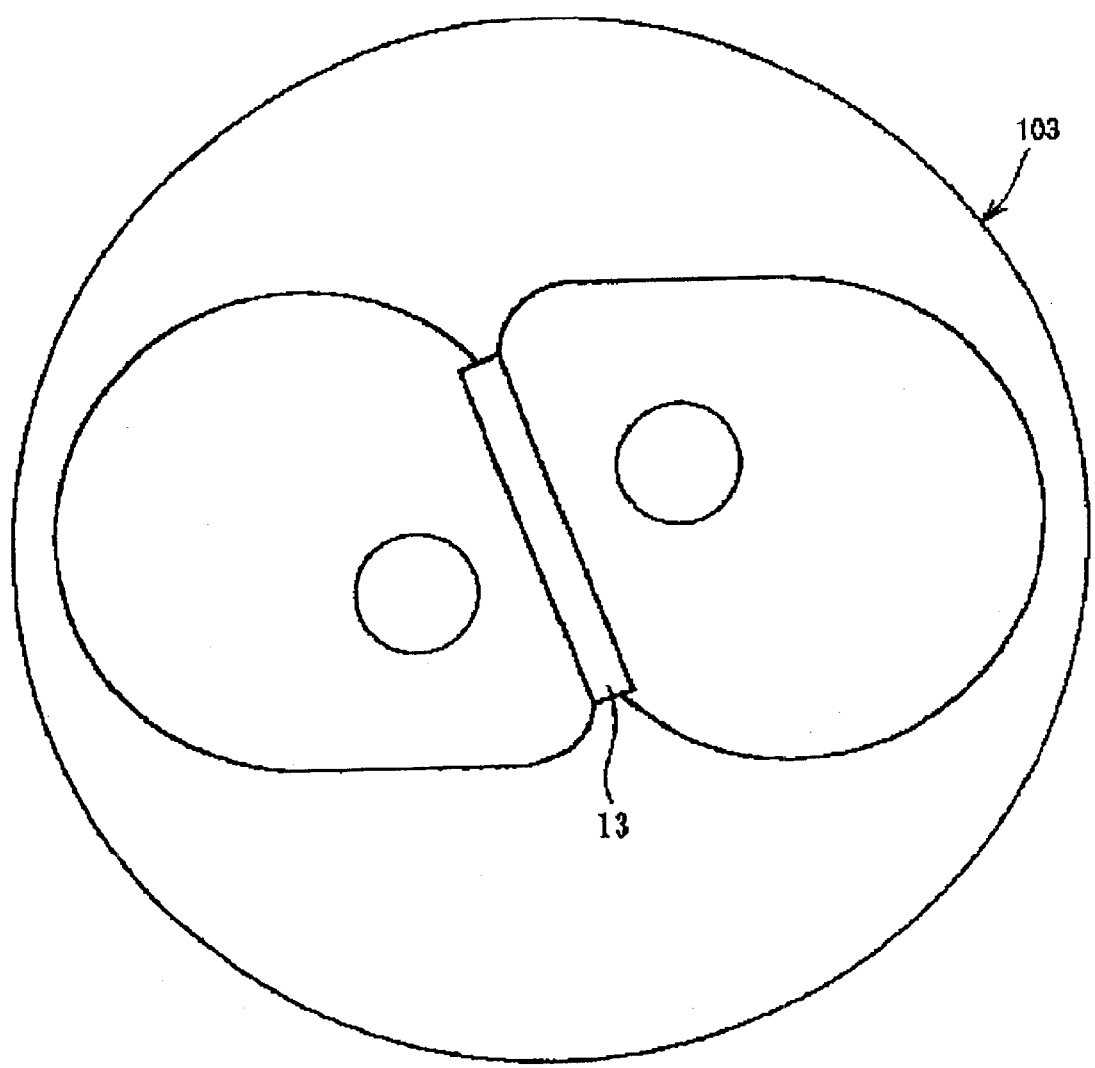
FIG. 26 is a top view showing the conventional storage case for excess length part of an optical fiber.

Although the aforementioned Japanese Laid-Open Patent Publication 174238/1999 shows the take-up member 103 having a configuration shaped into two huge commas so united as to make a perfect circle as shown in FIG. 26, the construction is not aimed to increase the winding amount of the optical fibers 6 effectively utilizing the blank space of the frame members 32. In this patent publication, a part of the circular outer circumference is turned into a straight line along the locus of winding an optical fiber on the take-up member 103 having a circular outer circumference shown in FIG. 24 and FIG. 25.

FIGS. 14 to 21 show a construction of the optical fiber reel 3 in which the convexities of the two discs each having the convexity serving as the optical fiber take-up member 31 are joined in the same manner as in the foregoing Embodiment 1. However, the invention is not limited to such a construction and it is also preferable that, for example, two optical fiber take-up members 31 are sandwiched between the two frame members 32 shaped into discs in the same manner as in the foregoing Embodiment.

In this Embodiment, a construction in which the radius R of the first convex circular arcs 81 is 25 mm is described. However, the invention is not limited to such a construction, and it is also preferable that the radius R of the first convex circular arc 81 is not less than 25 mm because it is generally said that the allowable curvature of optical fiber is R25. It is likewise preferable that the radius R of the third convex circular arc 82 is not less than 25 mm. The radius of the second convex circular arc 84 and the radius of the concave circular arc 83 respectively are varied corresponding to the radius R of the first convex circular arcs 81.

Each of the foregoing embodiments shows a construction in which the center points of the frame members 32 having the circular outer circumferential configurations are positioned coinciding with the point of symmetry of the optical fiber take-up members 31, and the most shallow portion M of the space between the outer circumferences of the optical fiber take-up members 31 and the outer circumferences of the frame members 32 is 4 mm, i.e., not less than 6d on both sides. However, it is not always necessary to make the center points of the frame members 32 coincide with the point of symmetry of the optical fiber take-up members 31. On condition that the most shallow portion of the space between the outer circumferences of the optical fiber take-up members 31 and the outer circumferences of the frame members 32 is not less than d and the portion on the opposite side is not less than 2d, it is possible to wind the optical fiber, for example, by further 90° from the condition of winding the optical fiber 61 by one round shown in FIG. 9, and this is sufficient in some cases depending upon the excess lengths of the optical fibers 6.

The space between the two optical fiber take-up members 31 is not limited to 2 mm, and it is preferable that the space is more than the diameter d of the optical fiber.

Each of the foregoing embodiments describes a construction in which the frame members 32 have outer circumferential configurations of circles of 110 mm in diameter. However, the diameter is not limited to 110 mm, and it is also preferable that the diameter is larger than the diameter of the circumcircle of the two optical fiber take-up members 31 by 3d.

Embodiment 4

Figure 22:
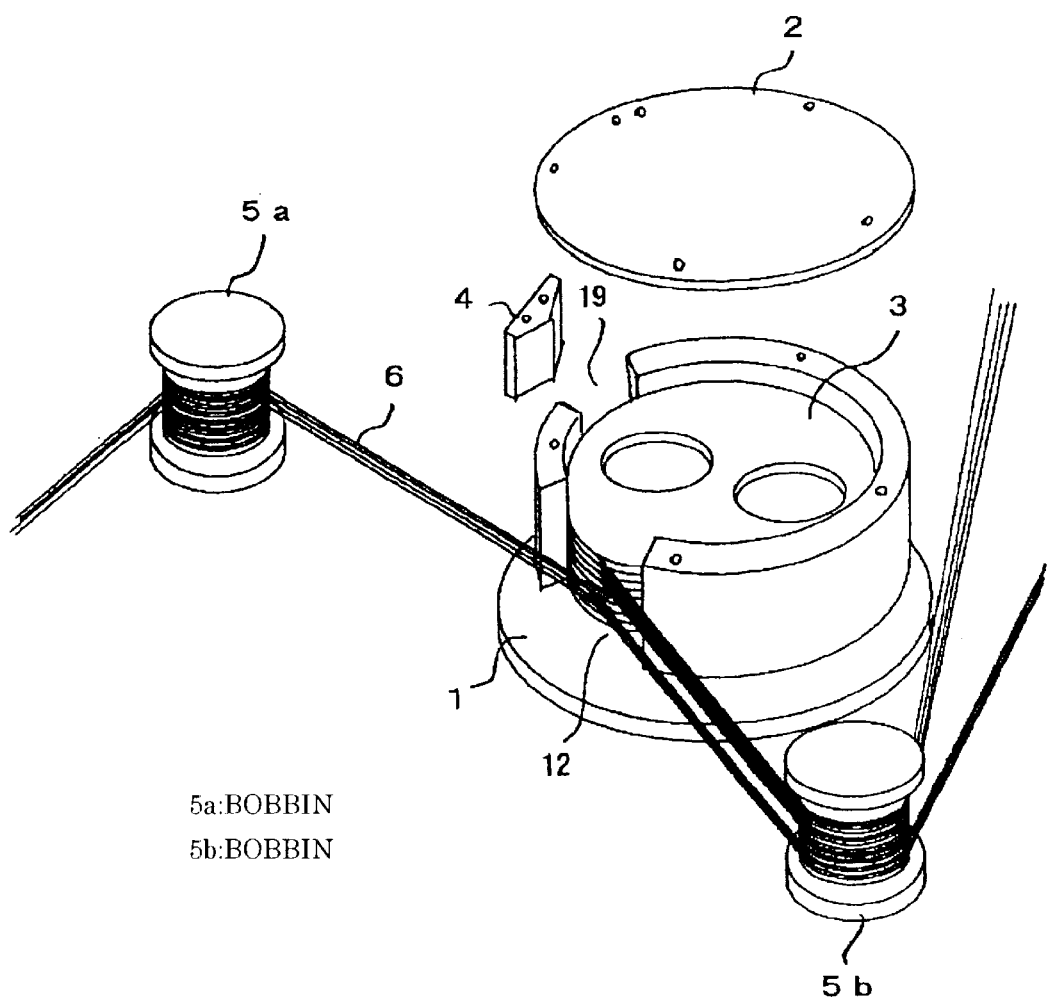

FIG. 22 is a view showing the storage case for storing an optical fiber according to the invention, and is more specifically a oblique drawing showing a state of using the case. In this embodiment, two bobbins 5a, 5b are placed on the left and right of the introduction opening 12 for the optical fibers 6. By placing the two bobbins 5a, 5b for adjusting the directions of the optical fibers 6 in this manner, it becomes possible to introduce the optical fibers 6 from various directions.

In the drawing, numeral 19 is an introduction opening for a pillar-shaped member placed on the outer circumferential portion of the case body 1. In this embodiment, there is a possibility of damaging the optical fibers 6 by pushing the pillar-shaped member 4 against the optical fiber reels 3 utilizing the introduction opening 12 for the optical fibers 6, and therefore another introduction opening 19 for the pillar-shaped member is arranged.

Embodiment 5

Figure 23:
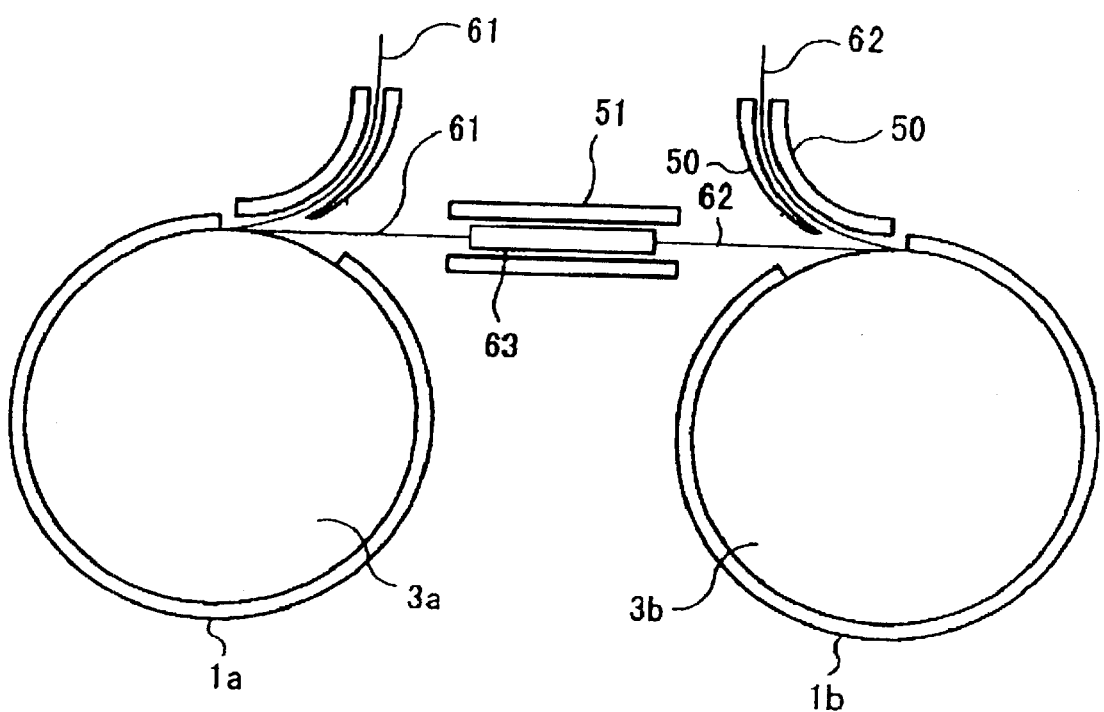
FIG. 23 is a top view showing the storage case for storing an optical fiber of the present invention.

FIG. 23 is a view showing the storage case for storing an optical fiber according to the invention, and is more specifically a top view showing a state of using the case. In the drawing, numerals 1a, 1b are case bodies. Numeral 50 is a guide for adjusting the direction of the optical fibers 6 with curvature of not less than R25. Numeral 51 is a portion for fixing fusion point. The optical fiber reels 3 shown in any of the foregoing Embodiments 1 to 3 are used as the optical fiber reels 3. The construction of the case body 1, lid 2, and so on is the same as that in Embodiment 1.

In this embodiment, the two case bodies 1a, 1b are placed in line symmetry. For example, in FIG. 6, arranging the fusion point 63 as the center, the optical fibers 61 and 62 on both sides thereof are stored in the different case bodies 1a, 1b, respectively.

It is preferable to use, for example, the same lid and pillar member described in the foregoing Embodiment 1 as the rotation locking mechanism. It is also preferable to mount the pillar member using the introduction opening for introducing the optical fibers 61, 62 arranged on the case bodies 1a, 1b, or to provide another introduction opening for the pillar member on the case bodies 1a, 1b.

In the above construction, it becomes possible to reduce the height of the case to half. Note that excess length portions of the optical fibers necessarily exist on both sides of each fusion point 63, and therefore number of the optical fiber reels 3 is even at all times, and the same numbers of the optical fiber reels 3 are stored in the two case bodies 1a, 1b.

In any of the foregoing embodiments, it is also preferable to use a plurality of optical fiber introduction openings 12 and a plurality of bobbins 5 depending upon the introduction angle of the optical fibers.

As described above, according to the present invention, an optical fiber reel, which is a reel for storing an optical fiber, comprises two optical fiber take-up members taking-up an optical fiber and two flat plate like frame members sandwiching the two optical fiber take-up members between them, the two flat plate like frame members, covering the two optical fiber take-up members, having external circumferential configuration of which diameter is larger than diameter of a circumscribed circle of the two optical take-up members by not less than three times of d of diameter of the optical fiber, and arranged facing each other to make a gap not less than d but less than 2d, each of the two optical fiber take-up members having an external circumferential take-up face and a pair of outer surfaces, and arranged as the pair of outer surfaces being parallel to a flat plate face of the frame members to make a gap of not less than d between each other external circumferential take-up faces of the take-up members, the external circumference of the plane like frame members and external circumferential take-up faces of the optical fiber take-up members constituting to make a gap of not less than d between them.

It is preferable that center point of the frame members having the circular outer circumferential configuration is located to coincide with a point of symmetry of the optical fiber take-up members.

As a result, it becomes possible to slide the optical fibers in the optical fiber reels and adjust the difference between the length of the optical fiber from the optical fiber reel, in which the optical fiber passes through the space at the center of the optical fiber reel, to the optical part and the length of the optical fiber to the fusion point to be a predetermined difference, whereby the excess lengths parts of the optical fibers are neatly stored without leaving any excess length part even when the excess lengths of the optical fibers to be stored are undetermined. Further, since the thickness of the optical fiber reel is so thin as to be slightly larger than the diameter of one optical fiber, it becomes possible to stack up and store plural optical fiber reels in the case body, and many excess length parts of optical fibers are stored saving the space.

The center point of the frame members having circular outer circumferential configurations is located coinciding with a point of symmetry of the optical fiber take-up members. As a result, it becomes possible to efficiently store the excess length parts of the optical fibers in any rotating direction of the optical fiber reels 3.

Each optical fiber reel has a construction in which two discs have convexities as the optical fiber take-up members and the convexities are joined each other. As a result, the case is easily manufactured.

The outer circumference of each optical fiber take-up member is shaped into a circle. As a result, a metal mold is easily manufactured.

The outer circumferential configuration of the optical fiber take-up members comprises: two first convex circular arcs which are located from the vicinity of center point of the frame members to the outer circumferential portion and have a radius R of less than one quarter of the diameter of each frame member; a concave circular arc which extends from a side end portion of the center point of one of said first convex circular arcs along the neighboring other first convex circular arc and has a radius of not less than R+d; and a curve which includes a second convex circular arc having a radius of not less than 2R and connects an outer circumferential side end portion of the frame member of said concave circular arc and an outer circumferential side end portion of the frame member of said first convex circular arc. As a result, it becomes possible to increase the winding amount of the optical fibers effectively utilizing the blank space of the frame members.

Since the frame members are 0.1 mm to 0.3 mm in thickness, it becomes possible to make the case compact sufficiently performing he function of the frame members.

The rotation locking mechanism comprises a lid which pushes the stacked optical fiber reels in a stacking direction and a pillar member which pushes a part of the outer circumferences of the frame members of the stacked optical fiber reels from the introduction opening formed on an outer circumferential portion of the case body toward the center point. As a result, it becomes possible to lock rotation of the optical fiber reels with a simple construction.

What is claimed is:

1. An optical fiber reel comprising:
    two optical fiber take-up members taking-up an optical fiber and two flat plate like frame members sandwiching said two optical fiber take-up members between them,
    said two flat plate like frame members, covering said two optical fiber take-up members, having external circumferential configuration of which diameter is larger than diameter of a circumscribed circle of the two optical take-up members by not less than three times of d of diameter of said optical fiber, and arranged facing each other to make a gap not less than d but less than 2d,
    each of said two optical fiber take-up members having an external circumferential take-up face and a pair of outer surfaces, and arranged as said pair of outer surfaces being parallel to a flat plate face of said frame members to make a gap of not less than d between each other external circumferential take-up faces of the take-up members,
    said external circumference of said plane like frame members and external circumferential take-up faces of said optical fiber take-up members constituting to make a gap of not less than d between them.

2. An optical fiber reel of claim 1, wherein a shape of said two optical fiber take-up members is a circle.

3. An optical fiber reel of claim 1, wherein a shape of said two optical fiber take-up members is two huge commas.

4. An optical fiber reel of claim 1, wherein said optical fiber reel is constructed by connecting two thin plates, which one having same shape of said frame member and having convexity of same shape of said take-up member and the other having same shape of said frame member.

5. An optical fiber reel of claim 4, wherein said thin plates are made of thermoplastic resin.

6. An optical fiber reel of claim 1, wherein said optical fiber reel is constructed by connecting two thin plates, having a same shape of said frame member and having two convexities of same figure and half thickness of said take-up member.

7. An optical fiber reel of claim 6, wherein said thin plates are made of thermoplastic resin and said connecting is carried by heating up and bonding together the two convexities of the thin plates.

8. An optical fiber storing case, comprising:
    an optical fiber reel, which comprises, two optical fiber take-up members taking-up
    an optical fiber and two flat plate like frame members sandwiching said two optical fiber take-up members between them, and covering member storing said optical fiber reel.
    said two flat plate like frame members, covering said two optical fiber take-up members, having external circumferential configuration of which diameter is larger than diameter of a circumscribed circle of the two optical take-up members by not less than three times of d of diameter of said optical fiber, and arranged facing each other to make a gap not less than d but less than 2d,
    each of said two optical fiber take-up members having an external circumferential take-up face and a pair of outer surfaces, and arranged as said pair of outer surfaces being parallel to a flat plate face of said frame members to make a gap of not less than d between each other external circumferential take-up faces of the take-up members, said external circumference of said plane like frame members and external circumferential take-up faces of said optical fiber take-up members constituting to make a gap of not less than d between them.

9. An optical fiber storing case of claim 8, wherein a connecting portion of said optical fiber is arranged at outer side of said optical fiber reel.

10. An optical fiber storing case of claim 8, comprising rocking means to prevent rotating of plural optical fiber reels.

11. An optical fiber storing case of claim 8, wherein a shape of said two optical fiber take-up members is a circle.

12. An optical fiber storing case of claim 8, wherein a shape of said two optical fiber take-up members is two huge commas.

13. An optical fiber storing case of claim 8, wherein said optical fiber reel is made by connecting two convexities of two thin plates having same shape of said frame members and having convexity of same shape and half thickness of said take-up member.

14. An optical fiber storing case of claim 13, wherein said thin plate is constructed from thermoplastic resin.

15. An optical fiber storing case of claim 8, wherein said optical fiber reel is constructed by connecting two thin plates, having a same shape of said frame member and having two convexities of same shape and half thickness of said take-up member.

16. An optical fiber storing case of claim 15, wherein said thin plate is constructed from thermoplastic resin, and said connecting is carried by heating up and bonding together the two convexities of the thin plates.

17. An optical repeater comprising, an optical equipment, an optical fiber connecting with said optical equipment and an optical fiber reel taking-up said optical fiber:

said optical fiber reel comprising, two optical fiber take up members taking-up an optical fiber and two flat plate like frame members sandwiching said two optical fiber take-up members between them, and a covering means storing said optical fiber reel, said two flat plate like frame members, covering said two optical fiber take-up members, having external circumferential configuration of which diameter is larger than diameter of a circumscribed circle of the two optical take-up members by not less than three times of d of diameter of said optical fiber, and arranged facing each other to make a gap not less than d but less than 2d, each of said two optical fiber take-up members having an external circumferential take-up face and a pair of outer surfaces, and arranged as said pair of outer surfaces being parallel to a flat plate face of said frame members to make a gap of not less than d between each other external circumferential take-up faces of the take-up members, said external circumference of said plane like frame members and external circumferential take-up faces of said optical fiber take-up members constituting to make a gap of not less than d between them.

18. An optical repeater of claim 17, wherein a connecting portion of said optical fiber is arranged at outer side of said optical fiber reel.

19. An optical repeater of claim 17, wherein a shape of said two optical fiber take-up members is a circle.

20. An optical repeater of claim 17, wherein a shape of said two optical fiber take-up members is two huge commas.

* * * * *